United States Patent
Farnsworth

(10) Patent No.: US 10,714,767 B2
(45) Date of Patent: Jul. 14, 2020

(54) FUEL CELL AIR SYSTEM SAFE OPERATING REGION

(71) Applicant: Toyota Motor Engineering & Manufacturing North America, Inc., Erlanger, KY (US)

(72) Inventor: Jared Farnsworth, Roseville, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 62 days.

(21) Appl. No.: 15/835,321

(22) Filed: Dec. 7, 2017

(65) Prior Publication Data

US 2019/0181467 A1    Jun. 13, 2019

(51) Int. Cl.
| | |
|---|---|
| *H01M 8/04111* | (2016.01) |
| *F28F 27/00* | (2006.01) |
| *B60L 1/00* | (2006.01) |
| *B60L 1/02* | (2006.01) |
| *B60L 58/33* | (2019.01) |

(52) U.S. Cl.
CPC ......... *H01M 8/04111* (2013.01); *B60L 1/003* (2013.01); *B60L 1/02* (2013.01); *F28F 27/00* (2013.01); *B60L 58/33* (2019.02); *B60L 2240/36* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 6,442,455 | B1 | 8/2002 | Kotre et al. |
| 6,480,767 | B2 | 11/2002 | Yamaguchi et al. |
| 6,635,374 | B1 | 10/2003 | Aramaki |
| 6,847,188 | B2 | 1/2005 | Keskula et al. |

(Continued)

FOREIGN PATENT DOCUMENTS

| | | |
|---|---|---|
| CN | 202065044 | 12/2011 |
| CN | 202930480 | 8/2013 |

(Continued)

OTHER PUBLICATIONS

Pablo Guinta et al.; "*Calculation of Multiplicity of Steady States in a Catalyst Pellet by Homotopic Continuation Method*"; AIChE Journal; (40 pages).

*Primary Examiner* — Devina Pillay
(74) *Attorney, Agent, or Firm* — Snell & Wilmer LLP

(57) ABSTRACT

Methods, systems, and device for controlling air flow within a vehicle for electrical generation. The air control system includes at least one of an air compressor, a back pressure valve or a bypass valve that controls air flow. The air control system includes one or more components. The air control system includes an electronic control unit. The electronic control unit is configured to obtain an air flow target and an air pressure ratio target and determine that the one or more components will operate outside a safe operating region. The electronic control unit is configured to determine a mediated air flow target and a mediated air pressure ratio target that causes the one or more components to operate within the safe operating region. The electronic control unit is configured to adjust the at least one of the air compressor, the back pressure valve or the bypass valve.

16 Claims, 6 Drawing Sheets

(56) References Cited

U.S. PATENT DOCUMENTS

| | | |
|---|---|---|
| 6,924,050 B2 | 8/2005 | Lahiff |
| 6,936,359 B2 | 8/2005 | Kobayashi et al. |
| 7,117,078 B1 | 10/2006 | Gangopadhyay |
| 7,124,040 B2 | 10/2006 | Engelhardt et al. |
| 7,141,326 B2 | 11/2006 | Kobayashi et al. |
| 7,247,401 B2 | 7/2007 | Aberle et al. |
| 7,348,082 B2 | 3/2008 | Kolodziej |
| 7,353,900 B2 | 4/2008 | Abe et al. |
| 7,608,011 B2 | 10/2009 | Grabowski et al. |
| 7,612,532 B2 | 11/2009 | Verbrugge |
| 7,682,717 B2 | 3/2010 | Ueda et al. |
| 7,682,719 B2 | 3/2010 | Lienkamp et al. |
| 7,687,164 B2 | 3/2010 | Frost et al. |
| 7,845,187 B2 | 12/2010 | Patel et al. |
| 7,919,211 B2 | 4/2011 | Nonobe et al. |
| 8,044,534 B2 | 10/2011 | Kojima et al. |
| 8,141,356 B2 | 3/2012 | Leone et al. |
| 8,153,321 B2 | 4/2012 | Katano |
| 8,215,428 B2 | 7/2012 | Lee et al. |
| 8,293,413 B2 | 10/2012 | Bono |
| 8,342,275 B2 | 1/2013 | Ojima et al. |
| 8,394,542 B2 | 3/2013 | Elwart et al. |
| 8,486,574 B2 | 7/2013 | Jenings |
| 8,498,766 B2 | 7/2013 | Takahashi et al. |
| 8,561,453 B2 | 10/2013 | Hobmeyr et al. |
| 8,568,935 B2 | 10/2013 | Arthur et al. |
| 8,673,515 B2 | 3/2014 | Harris et al. |
| 8,684,117 B2 | 4/2014 | Ptacek et al. |
| 8,691,456 B2 | 4/2014 | Choe et al. |
| 8,715,875 B2 | 5/2014 | Chan et al. |
| 8,722,263 B2 | 5/2014 | Cai et al. |
| 8,754,392 B2 | 6/2014 | Caimi et al. |
| 8,757,223 B2 | 6/2014 | Uemura |
| 8,796,984 B2 | 8/2014 | Yoshida et al. |
| 8,846,262 B2 | 9/2014 | Mussro et al. |
| 8,920,995 B2 | 12/2014 | Lebzelter et al. |
| 8,935,029 B2 | 1/2015 | Sabrie et al. |
| 8,951,685 B2 | 2/2015 | Aso et al. |
| 8,956,778 B2 | 2/2015 | Zhang et al. |
| 8,962,208 B2 | 2/2015 | Mussro et al. |
| 8,986,899 B2 | 3/2015 | Harris et al. |
| 8,997,771 B2 | 4/2015 | Lee et al. |
| 9,002,568 B2 | 4/2015 | Datta et al. |
| 9,005,785 B2 | 4/2015 | Alp et al. |
| 9,021,824 B2 | 5/2015 | Koo et al. |
| 9,099,701 B2 | 8/2015 | Maslyn et al. |
| 9,187,009 B2 | 11/2015 | Jeon et al. |
| 9,242,532 B2 | 1/2016 | Kim et al. |
| 9,242,573 B2 | 1/2016 | Lee et al. |
| 9,281,532 B2 | 3/2016 | Lebzelter et al. |
| 9,281,533 B2 | 3/2016 | Ozawa et al. |
| 9,312,549 B2 | 4/2016 | Tachibana et al. |
| 9,318,778 B2 | 4/2016 | Wahlstrom et al. |
| 9,358,900 B2 | 6/2016 | Wake et al. |
| 9,437,884 B2 | 9/2016 | Kolodziej |
| 9,457,640 B2 | 10/2016 | Ikeya |
| 9,472,818 B2 | 10/2016 | Kilmer |
| 9,527,404 B2 | 12/2016 | Gauthier et al. |
| 9,531,019 B2 | 12/2016 | Jeon |
| 9,590,259 B2 | 3/2017 | Toida |
| 9,614,236 B2 | 4/2017 | Yu et al. |
| 9,620,796 B2 | 4/2017 | Tomita et al. |
| 9,620,799 B2 | 4/2017 | Igarashi et al. |
| 9,643,517 B2 | 5/2017 | Watanabe et al. |
| 2003/0105562 A1 | 6/2003 | Hsiao et al. |
| 2004/0018399 A1 | 1/2004 | Jung |
| 2004/0161643 A1* | 8/2004 | Uehara ............ H01M 8/04089 429/443 |
| 2006/0134472 A1 | 6/2006 | Bach et al. |
| 2008/0286622 A1 | 11/2008 | Shaw et al. |
| 2009/0050082 A1 | 2/2009 | Iwasaki |
| 2009/0317678 A1* | 12/2009 | Bono ................ H01M 8/04007 429/436 |
| 2011/0214930 A1 | 9/2011 | Betts et al. |
| 2012/0129059 A1 | 5/2012 | Ohashi |
| 2014/0000859 A1 | 1/2014 | Abihana |
| 2014/0000862 A1 | 1/2014 | Abihana et al. |
| 2014/0103128 A1 | 4/2014 | Patel et al. |
| 2014/0120440 A1 | 5/2014 | Nolan et al. |
| 2014/0335432 A1 | 11/2014 | Sinha et al. |
| 2014/0342253 A1 | 11/2014 | Lee et al. |
| 2014/0370412 A1 | 12/2014 | Sumser et al. |
| 2015/0188157 A1 | 7/2015 | Na et al. |
| 2016/0006049 A1 | 1/2016 | Kwon et al. |
| 2016/0137096 A1 | 5/2016 | Oda et al. |
| 2016/0141645 A1 | 5/2016 | Yamada et al. |
| 2016/0141661 A1 | 5/2016 | Kim et al. |
| 2016/0141666 A1 | 5/2016 | Shim et al. |
| 2016/0153367 A1 | 6/2016 | Yoon |
| 2016/0172696 A1 | 6/2016 | Milacic et al. |
| 2016/0211536 A1 | 7/2016 | Kwon et al. |
| 2016/0308228 A1* | 10/2016 | Takahashi ......... H01M 8/04753 |
| 2016/0336607 A1 | 11/2016 | Lee et al. |
| 2016/0359181 A1 | 12/2016 | Lee |
| 2016/0372768 A1 | 12/2016 | Proctor et al. |
| 2017/0012310 A1 | 1/2017 | Han et al. |
| 2017/0047603 A1 | 2/2017 | Kazuno |
| 2017/0092972 A1 | 3/2017 | Pence |
| 2017/0162885 A1 | 6/2017 | Kim |
| 2017/0179511 A1 | 6/2017 | Jung et al. |

FOREIGN PATENT DOCUMENTS

| | | |
|---|---|---|
| CN | 105895941 | 8/2016 |
| DE | 102012224052 | 6/2014 |
| GB | 2533015 | 6/2016 |
| JP | 2005347008 | 12/2005 |
| KR | 100863649 | 6/2007 |
| WO | WO2005078257 | 8/2005 |
| WO | WO2013073457 | 5/2013 |

* cited by examiner

FUEL CELL AIR SYSTEM SAFE OPERATING REGION

BACKGROUND

1. Field

This specification relates to a system and a method for operating components of an air flow system for a fuel cell device within a safe operating region.

2. Description of the Related Art

Vehicles, such as electric vehicles (EV), have fuel cells that operate within specific operational parameters, such as temperature, air flow rate and air pressure to power the vehicle. When operating within operational parameters, the vehicles operate at peak efficiency. That is, the components of the vehicle operate within hardware limitations so as not to damage the components and/or operate inefficiently when generating electrical energy.

A vehicle controls the air flow to maintain the stability and the reliability of the fuel cells within the vehicle. The system that controls the air flow may have one or more components, such as a fuel stack, an air compressor, cooling water circulation, a humidifier, pumps and other electrical control equipment to maintain the stability and the reliability of the fuel cells to generate electrical energy.

A typical system may detect that the air pressure ratio or temperature within the system exceeds a threshold value and will adjust air flow within the system so that the air pressure ratio or temperature of the system does not exceed hardware limitations. This, however, results in some damage to components of the system because the system is reactive and requires that the components exceed the hardware limitations before the system detects and adjusts the air pressure ratio and/or temperature.

Accordingly, there is a need for a system and method to predictively control the air flow to the fuel cell to prevent damage to components and/or other inefficiencies to the components that facilitate air flow to the fuel cell.

SUMMARY

In general, one aspect of the subject matter described in this specification is embodied in an air control system. The air control system includes at least one of an air compressor, a back pressure valve or a bypass valve that controls air flow. The air control system includes one or more components including at least one of the air compressor, an inter cooler or a fuel cell, the one or more components configured to facilitate the generation of electrical energy. The air control system includes an electronic control unit. The electronic control unit is configured to obtain an actuation request that includes an air flow target and an air pressure ratio target and determine or predict that the one or more components will operate outside a safe operating region based on the air flow target and the air pressure ratio target. The electronic control unit is configured to determine a mediated air flow target and a mediated air pressure ratio target that causes the one or more components to operate within the safe operating region. The electronic control unit is configured to adjust the at least one of the air compressor, the back pressure valve or the bypass valve based on the mediated air flow target and the mediated air pressure ratio target.

These and other embodiments may optionally include one or more of the following features. The electronic control unit may be configured to determine a position or setting for at least one of the air compressor, the back pressure valve or the bypass valve based on the mediated air flow target and the mediated air pressure ratio target. The electronic control unit may adjust the at least one of the air compressor, the back pressure valve or the bypass valve based on the position or setting. The electronic control unit may be configured to operate the one or more components in the safe operating region with an air pressure ratio that is greater than or equal to a minimum allowable pressure ratio for the air compressor and less than or equal to a maximum allowable pressure ratio for the air compressor. The outlet air of the air compressor may have a temperature that is less than a maximum allowable temperature that flows into the inter cooler.

The electronic control unit may be configured to determine or predict that the air pressure ratio target is less than a minimum threshold value or greater than a maximum threshold value. The electronic control unit may be configured to determine or predict that the temperature is greater than a maximum threshold value. The electronic control unit be configured to adjust the bypass valve to a partially opened position and may adjust the back pressure valve to a closed position.

In another aspect, the subject matter is embodied in a method for controlling operation of an air compressor. The method includes obtaining, by a processor, an actuation request for the air compressor that includes an air flow target and an air pressure ratio target. The method includes predicting, by the processor, that the air compressor will operate within a surge or a stall region based on the air flow target and the air pressure ratio target. The method includes determining, by the processor, a mediated air flow target and a mediated air pressure ratio target that causes the air compressor to operate within a safe operating region. The method includes controlling, by the processor, a position or setting of the at least one of the air compressor, the back pressure valve or the bypass valve based on the mediated air flow target and the mediated air pressure target.

In another aspect, the subject matter is embodied in an air control system for a vehicle. The air control system includes one or more components for electrical energy generation and one or more valves that control air flow to the one or more components. The air control system includes an electronic control unit. The electronic control unit is configured to obtain an air flow target and an air pressure ratio target. The electronic control unit is configured to determine a mediated air flow target and a mediated air pressure ratio target that causes the one or more components to operate within a safe operating region when the air flow target or the air pressure ratio target causes an air compressor to operate outside the safe operating region. The electronic control unit is configured to adjust the one or more valves based on the mediated air flow target and the mediated air pressure ratio target to operate within the safe operating region.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for controlling airflow within a fuel cell device of a vehicle. Particular embodiments of the subject matter described in this specification may be implemented to realize one or more of the following advantages.

An air control system that is integrated, embedded and/or included within a vehicle controls and/or manages the air flow to a fuel cell device to regulate and/or control temperature, pressure and other parameters within components that regulate the air flow to the fuel cell, such as an air compressor and/or an inter cooler. The air control system regulates and/or controls the parameters of the components so that the components operate within a safe operating region. The safe operating region defines the hardware limits in which the components are able to operate normally. By operating the components within the safe operating region, the components are prevented from operating beyond the hardware limits of the components, which reduces stress on the components and increases the efficiency of the fuel cell.

The air control system is configurable to control a number of parameters, such as the speed of the motor of the air compressor, the air temperature, the air flow rate and/or the air pressure ratio. The air control system may open, close and/or partially open the bypass valve and/or back pressure valve to control the air flow. The air control system may control the speed of the motor to increase or decrease air flow through the air compressor. By releasing and/or restricting the amount of air flow through each of the valves and/or controlling the speed of the motor, the air control system may regulate or control pressure and/or air flow rate within each of the components, such as the air compressor, the fuel cell, and/or the inter cooler. This allows the air control system to maintain the operation of each of the components within particular performance parameters specific to each of the components, e.g., so that the air compressor does not surge or stall but instead operate within the safe operating region.

Other benefits and advantages include being able to control each of the components to control and/or regulate the temperature. The air control system may regulate and/or control the air flow through the valves to prevent the temperature of the air from exceeding an upper limit when the air exits the inter cooler outlet. This prevents heat from damaging the fuel cell.

Figure 1:
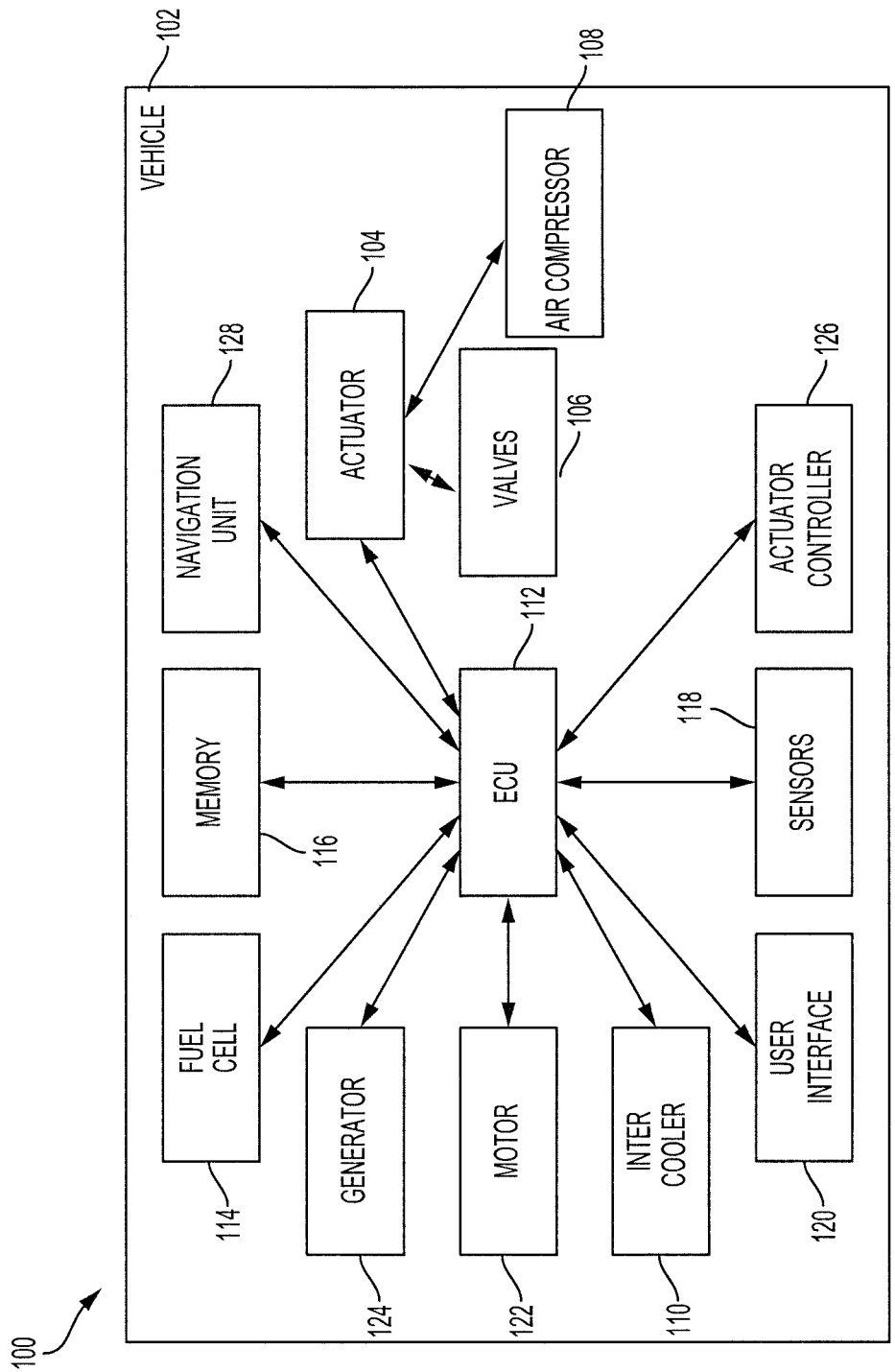
FIG. 1 is a block diagram of an exemplary air control system according to an aspect of the invention.

FIG. 1 is a block diagram of an air control system 100. The air control system 100 includes one or more actuators 104 including one or more valves 106 or an air compressor 108, a fuel cell 114, an inter cooler 110 and a processor, such as the electronic control unit (ECU) 112 or an actuator controller 126. The air control system 100 may include a memory 116, a user interface 120 and/or one or more sensors 118. The air control system 100 includes one or more processors, such as the ECU 112 and actuator controller 126, appropriately programmed, to control air flow rate, pressure, speed and/or temperature of air flowing into the air compressor 108 to the fuel cell 114.

The air control system 100 includes an actuator controller 126. The actuator controller 126 provides one or more actuator control requests to the ECU 112 and/or the one or more actuators 104. The actuator control requests indicate various targets, such as speed, temperature and/or pressure for the air flow within the air control system 100 and/or for each component, such as the air compressor 108, the inter cooler 110 and/or the fuel cell 114. The actuator controller 126 initiates changes to the position of the valves 106 or setting of the air compressor 108 to set the parameters to the various targets.

Figure 3:
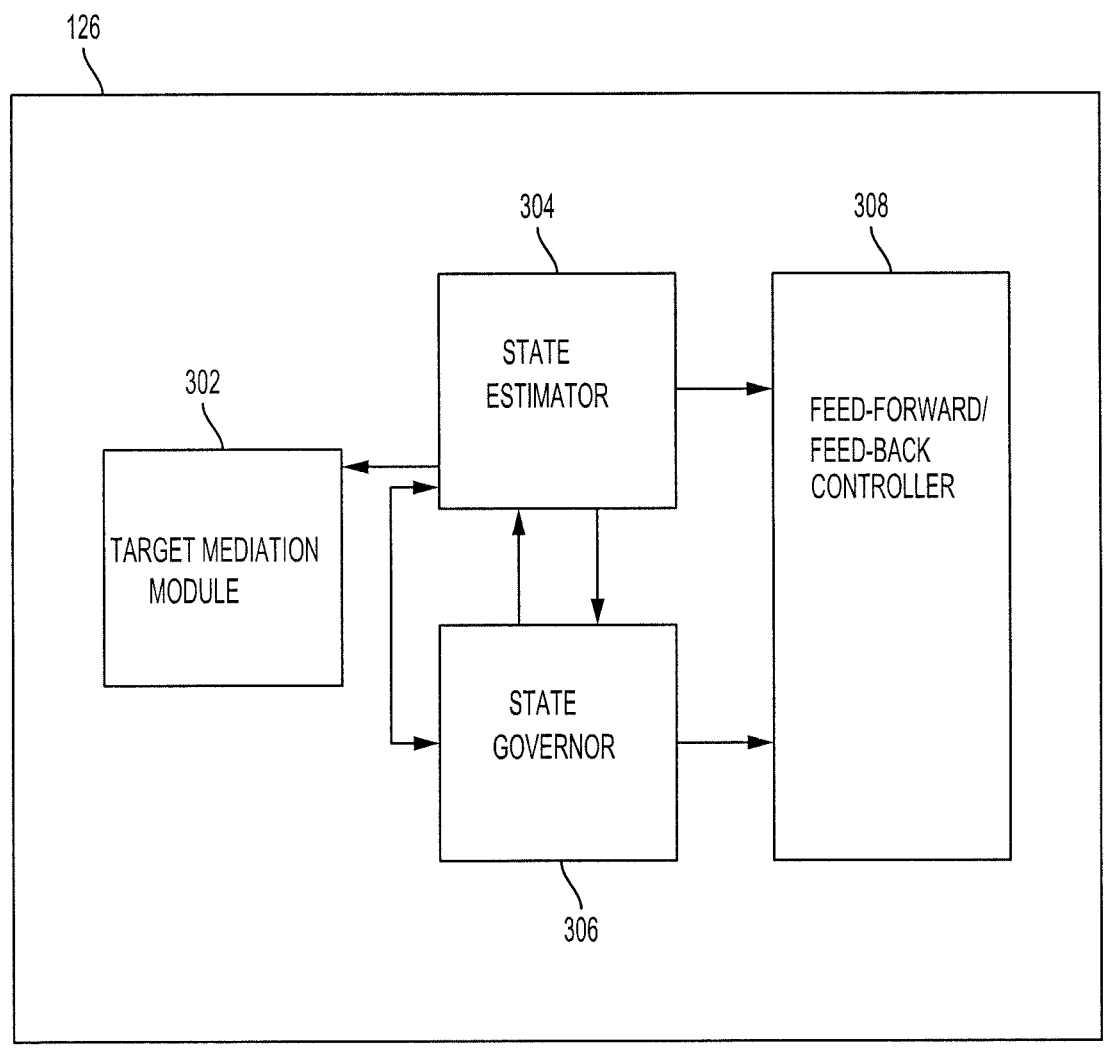
FIG. 3 is a block diagram of one or more modules within the actuator controller of the air control system of FIG. 1 according to an aspect of the invention.

The actuator controller 126 may have one or more modules, such as the target mediation module 302, the state estimator 304, the state governor 306, and/or the feed-forward/feed-back controller 308, as shown in FIG. 3 for example. The target mediation module 302 may modify the various targets based on hardware limitations of the components, such as the air compressor 108, the inter cooler 110 and/or the fuel cell 114. The state estimator 304 may estimate the current state and/or the target state of the one or more parameters for the one or more components. The state governor 306 may set a target state for the one or more components and may coordinate the one or more actuators to control the parameters of the one or more components. The feed-forward/feed-back controller 308 may provide the actuator control request to the one or more actuators 104 to move and/or position the one or more valves 106 or set the motor speed of the air compressor 108 to control the parameters for the one or more components. The actuator control request may include the amount of torque used by the one or more actuators 104 to position the one or more valves 106.

The air control system 100 includes a processor, such as the ECU 112. The ECU 112 may be implemented as a single ECU or as multiple ECUs. The ECU 112 may be electrically coupled to some or all of the components of the vehicle 102, such as the generator 124, the motor 122 and/or the navigation unit 128. The ECU 112 may include one or more processors or controllers specifically designed for controlling the one or more actuators 104 and/or obtaining data from the one or more sensors 118 to control various targets, e.g., for speed, air pressure ratio, air flow rate and/or temperature, for the air within the one or more components of the air control system 100. The ECU 112 may be coupled to a memory 116 and execute instructions that are stored on the memory 116.

The memory 116 may be coupled to the ECU 112 and store instructions that the ECU 112 executes. The memory 116 may include one or more of a Random Access Memory (RAM) or other volatile or non-volatile memory. The memory 116 may be a non-transitory memory or a data storage device, such as a hard disk drive, a solid-state disk drive, a hybrid disk drive, or other appropriate data storage, and may further store machine-readable instructions, which may be loaded and executed by the ECU 112.

The air control system 100 includes one or more actuators 104. The one or more actuators 104 include the air compressor 108 and the one or more valves 106, such as the back pressure valve 106a or the bypass valve 106b. The air compressor 108 may have a setting that controls the speed of a motor that spins an impeller that draws air into the air compressor 108 and controls the air flow out. The one or more valves 106 may be opened, closed, or partially opened to control the air flow rate and pressure within the one or more components of the air control system 100. The one or more actuators 104 may coordinate the control of the one or more valves 106 and/or the air compressor 108. For example, a first actuator may be in an open position, a second actuator may be in a closed position and a third actuator may be set to an increased motor speed to control the air flow rate and/or air pressure ratio.

Figure 2:
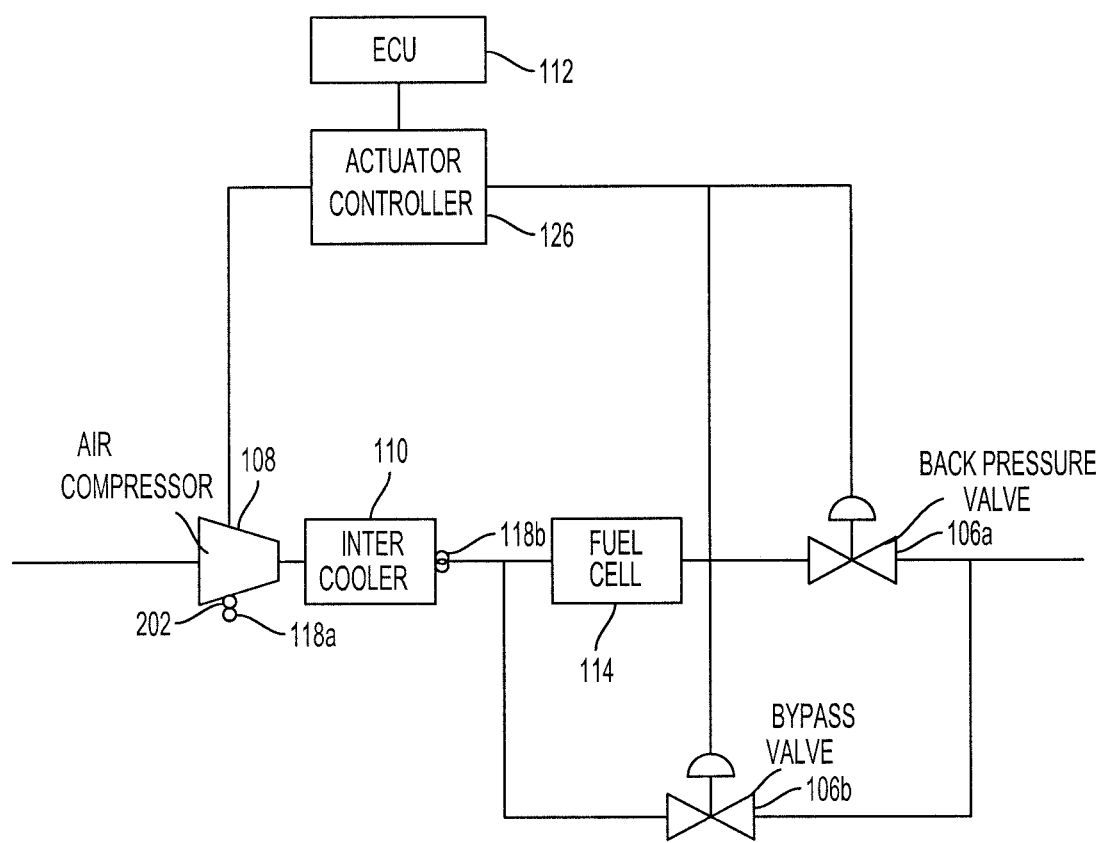
FIG. 2 shows the air control system of FIG. 1 according to an aspect of the invention.

The one or more valves 106 include a back pressure valve 106a and a bypass valve 106b, as shown in FIG. 2 for example. The speed of the motor that spins the impeller controls the air flow rate into the air compressor 108. The back pressure valve 106a controls the air flow rate that is released out from the fuel cell 114. The bypass valve 106b controls the air flow rate that bypasses the fuel cell 114 from the outlet of the inter cooler 110. FIG. 2 further describes the air flow through the various valves 106 and components of the air control system 100.

The air control system 100 includes one or more components, such as the inter cooler 110, the air compressor 108, and/or the fuel cell 114. The air compressor 108 delivers air to the fuel cell 114. The air compressor 108 may deliver extra air through the fuel cell 114 to increase power and/or maintain the air pressure throughout the air control system 100. The air compressor 108 pumps air using a motor. The inter cooler 110 cools airflow provided by the air compressor 108 before entering the fuel cell 114. The inter cooler 110 removes heat from the airflow to allow air below a maximum temperature level to enter the fuel cell 114. The fuel cell 114 may chemically fuse oxygen from the air and hydrogen from the fuel tank to make water and release electrical energy that powers the motor 122 of the vehicle 102.

The air control system 100 may include one or more sensors 118. The one or more sensors 118 may include a temperature sensor that measures an ambient temperature of the air as the air enters the air compressor 108 or out into the inter cooler 110. The one or more sensors 118 may include an air pressure sensor that measures the ambient air pressure at the inlet of the air compressor 108 or the air pressure as the air exits the outlet of the air compressor 108. The one or more sensors 108 may include an air flow sensor that measures the air flow rate at the air compressor 108. The one or more sensors 118 may include a speed sensor that measures the speed of the motor of the air compressor 108.

The air control system 100 may include a user interface 120. The air control system 100 may display one or more notifications on the user interface that indicate initialization of the air control system 100 or an adjustment by the air control system 100 when managing and/or controlling the air flow into the fuel cell 114. The air control system 100 may display the operating temperature, speed or air pressure for air flowing through the one or more components to assist in maintenance of the vehicle 102.

The air control system 100 is included in a vehicle 102. A vehicle 102 is a conveyance capable of transporting a person, an object, or a permanently or temporarily affixed apparatus. A vehicle 102 may be a self-propelled wheeled conveyance, such as a car, a sports utility vehicle, a truck, a bus, a van or other motor or battery driven or fuel cell driven vehicle. For example, the vehicle 102 may be an electric vehicle, a hybrid vehicle, a plug-in hybrid vehicle or any other type of vehicle that includes has a fuel cell 114, a motor 122 and/or generator 124. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors 118 and/or navigation unit 128 to drive autonomously.

The vehicle 102 may include a motor 122 and/or a generator 124. The motor 122 and/or generator 124 may be an electric motor and an electric generator that converts electrical energy into mechanical power, such as torque, and converts mechanical power into electrical energy.

The vehicle 102 may include a navigation unit 128 that obtains navigational map information and/or vehicle information to autonomously navigate the vehicle 102 and/or display to the user through the user interface 120. The navigational map information may include a map that identifies roadways, terrains and other points of interest to navigate the vehicle 102. The navigational map information may include route information that includes a starting point, a destination and a path of travel from the starting point to the destination point for the vehicle 102. The vehicle information may include a current location of the vehicle 102, a current direction of travel of the vehicle 102 and/or a current speed of the vehicle 102.

FIG. 2 shows the air control system 100. The ECU 112 may be coupled to and provide instructions to the actuator controller 126. The actuator controller 126 may control the one or more actuators 104 to adjust the one or more valves 106 or the air compressor 108. The air control system 100 sets the speed of the motor of the air compressor 100 and/or moves, places or positions the one or more valves 106 in an open, closed or partially open position to restrict or allow air to flow.

The air compressor 108 controls air flow that enters into the air compressor 108. The air compressor 108 has a motor 202 that powers an impeller that sucks the air into the air compressor 108. The one or more sensors 118 may be connected to the various components. For example, a first sensor 118a may be positioned near or connected to the air compressor 108. The first sensor 118a may measure the speed of the motor of the air compressor 108 and/or the temperature of the motor of the air compressor 108. In another example, a second sensor 118b may be placed after the inter cooler 110, such as at an outlet of the inter cooler 110, to measure the air temperature and/or air pressure as the air exits the inter cooler 110.

Air may flow into the air compressor 108. The air control system 100 may control the speed of the motor and adjust the speed to control air flow into and out of the air compressor 108. The inter cooler 110 cools the air and/or removes heat from the air. The air from the outlet of the inter cooler 110 flows into the fuel cell 114 and/or a valve that bypasses the fuel cell 114 based on the positions of the bypass valve 106b and/or the back pressure valve 106a. If the back pressure valve 106a is closed and the bypass valve 106b is open or partially opened, the air flows through the path that bypasses the fuel cell 114. If the back pressure valve 106a is open, the air flows at least partially through the fuel cell 114. If the bypass valve 106b is open, the air at least partially flows through the path that bypasses the fuel cell 114. The air control system 100 controls the position of the back pressure valve 106a and bypass valve 106b to allow air to pass through the two paths.

Figure 4:
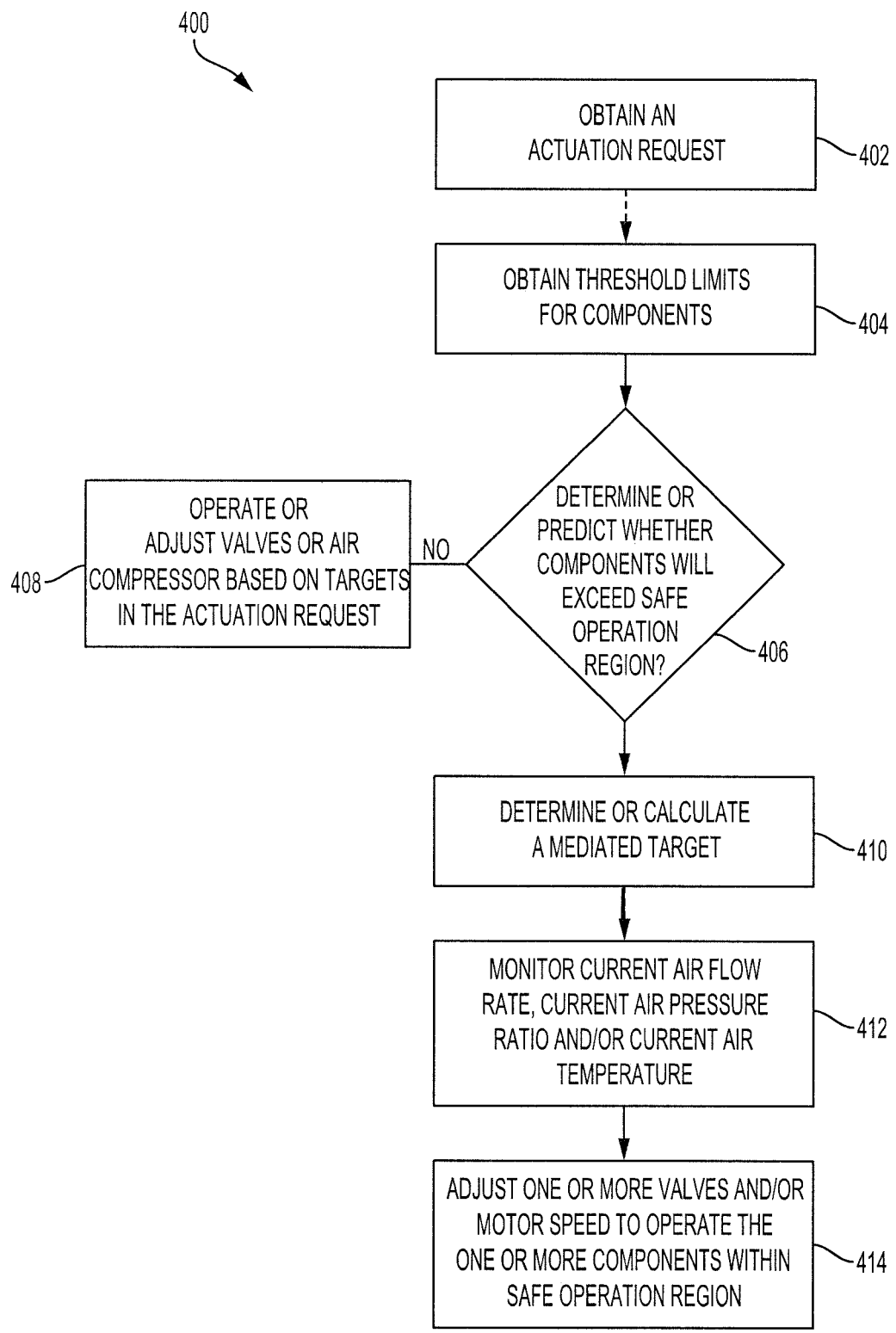
FIG. 4 is a flow diagram of an example process for operating components of an air control system within a safe operating region according to an aspect of the invention.

FIG. 4 is a flow diagram of a process 400 for operating components of an air control system 100 within a safe operating region. One or more computers or one or more data processing apparatuses, for example, the one or more processors, such as the ECU 112 or the actuator controller 126 of the air control system 100 of FIG. 1, appropriately programmed, may implement the process 400 to operate the components of the air control system 100 within a safe operating region.

The air control system 100 obtains an actuation request (402). The actuation request includes an overall target that specifies at least one of an air flow rate, an air pressure ratio target or an air temperature for the entire air control system 100. The air pressure ratio target is the ratio of the air pressure at the outlet of the air compressor 108 over the air pressure at the inlet of the air compressor 108. In some implementations, the actuation request includes a maximum air pressure limit for the air control system 100 and calculates the air pressure ratio target from the maximum air pressure limit for the air control system 100.

The air control system 100 may obtain one or more threshold limits for the one or more components of the air control system 100 (404). The air control system 100 may obtain the one or more threshold limits from the memory 116 or the threshold limits may be pre-programmed into the one or more processors of the air control system 100. The one or more threshold limits represent the hardware limitations of the different components, such as the air compressor 108, the inter cooler 110 and the fuel cell 114. The one or more threshold limits may include a maximum and minimum air pressure ratio, a motor speed, an air temperature, and/or an air flow rate for the various components. Other hardware limitations include a minimum water balance within the fuel cell 114, which is affected by the air flow rate and the air pressure within the fuel cell 114.

The air control system 100 determines or predicts whether any of the components would operate outside the safe operating region based on the actuation request that includes the overall targets, such as the air pressure ratio target, air temperature target or the air flow rate target (406). The safe operating region is the region where air that flows through the components causes the components to operate within hardware limits. This prevents the components from exceeding hardware limitations that may result in damage and/or increased inefficiencies.

For example, by operating within the safe operating region, the air control system 100 prevents the air compressor 108 from entering into a surge region, which may cause damage to the air compressor 108 and/or cause the air compressor 108 to provide incorrect air flow to the other components. In another example, the air control system 100 prevents the air compressor 108 from entering into a stall region, which may cause the air compressor 108 to operate inefficiently. Moreover, the air compressor 108 is operated below a maximum air pressure, a maximum air flow rate and/or a maximum motor speed and/or above a minimum air pressure, a minimum air flow rate or a minimum motor speed when operating within the safe operating region. Additionally, the fuel cell 114 has to operate below a maximum pressure and above a minimum pressure to maintain a water balance within the fuel cell 114 to prevent damage to the fuel cell 114.

The air control system 100 may compare targets, such as the air pressure ratio target and/or the air flow rate target, to the one or more threshold limits for each of the one or more components to determine or predict whether the one or more components remain within the safe operating region during operation.

If the air control system 100 determines that all components within the air control system 100 would operate within hardware limitations, the air control system 100 operates or adjusts the valves 106 and/or the speed of the motor of the air compressor 108 based on the overall targets included in the actuation request (408).

If the air control system predicts or determines that the overall targets, such as the air flow rate, the air temperature and/or the air pressure ratio target causes one of the components to exceed the safe operating region, the air control system 100 calculates or determines a mediated target, such as a mediated air flow rate, a mediated air pressure ratio and/or a mediated temperature, so that all the components within the air control system 100 operate within the safe operating region (410). The air control system 100 may calculate or determine the mediated air flow rate, the mediated temperature and/or the mediated air pressure ratio based on the one or more threshold limits that represent the hardware limitations, such that each component within the air control system 100 operates within the hardware limitations of the component. That is, the air control system 100 may limit a target of one of the components, such as the air pressure ratio within the air compressor 108, based on the target of another component, such as the air temperature entering the inter cooler 110.

Figure 6:
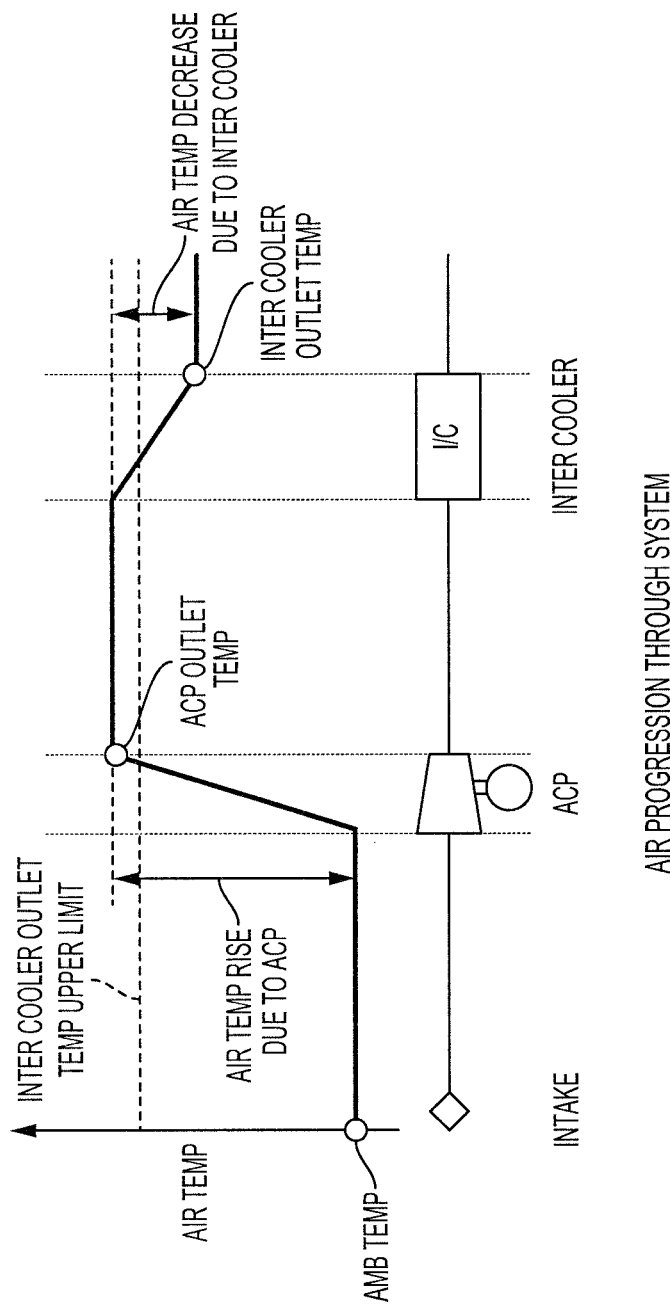
FIG. 6 shows the effect of the air temperature as the air progresses through the air control system of FIG. 1 according to an aspect of the invention.

For example, the air control system 100 may limit the air pressure ratio and/or the air flow rate exiting the air compressor 108 to below a maximum threshold limit to prevent the temperature of the air into the inter cooler 110 from exceeding a maximum temperature. When air passes through the air compressor 108, compression increases the air temperature of the air that enters the inter cooler 110, and thus, the air flow rate and the air pressure ratio of the air are within the safe operating region to maintain the temperature of the air that enters of the inter cooler 110. That is, the air control system 100 limits the maximum allowable pressure ratio and the air flow rate into the air compressor 108 to control the ratio of the air temperature entering the inter cooler 110 and exiting the inter cooler 110 into the fuel cell 114. The ratio of the air temperature is calculated from the ambient temperature and the temperature change through the inter cooler 110. This limits the air temperature at the outlet of the inter cooler from exceeding a maximum threshold limit. The air temperature that enters the inter cooler 110 is maintained below a maximum temperature threshold limit so that the air that is cooled when the air passes through the inter cooler drops below a threshold limit to allow the fuel cell 114 to operate efficiently. The maximum threshold limits for the air flow rate and the air pressure ratio are set at the required temperature rise ratio of the air compressor 108. FIG. 6 shows the effect of the air temperature as the air progresses through the air control system 100.

In another example, the air control system 100 may determine an overall minimum air pressure ratio threshold limit that is greater than or equal to the minimum air pressure ratio limit of each of the one or more components. In another example, the air control system 100 may determine an overall maximum air pressure ratio threshold limit that is less than or equal to the maximum air pressure ratio limit of each of the one or more components.

The air control system 100 may determine other overall threshold limits for the temperature, the speed of the motor, and/or the air flow rate. The overall maximum threshold limits may be less than or equal to the lowest individual maximum threshold limit among the one or more components, and the overall minimum threshold limits may be greater than or equal to the highest individual minimum threshold limit among the one or more components.

In some implementations, the air control system 100 may implement an additional safety margin, such that the overall minimum threshold limit is a safety margin greater than the highest minimum threshold limit among the one or more components and/or the overall maximum threshold limit is a safety margin less than the lowest maximum threshold limit among the one or more components.

The air control system 100 may monitor the current parameters including the current air flow rate, the current air pressure ratio and/or the air temperature (412). The air control system 100 obtains, using one or more sensors 118, such as an air pressure sensor, the air pressure at the inlet and outlet of the air compressor 108. The air control system 100 may calculate the air pressure ratio by taking a ratio of the current air pressure at the outlet over the current air pressure at the inlet. The air flow rate may be obtained or measured using a sensor, such as an air flow sensor, and the temperature may be obtained or measured using another sensor, such as an air temperature sensor.

The air control system 100 adjusts one or more valves 106 and/or the speed of the motor to operate the one or more components within the safe operating region based on the mediated targets (414). That is, the air control system 100 may adjust any one of the one or more valves 106 from a first position, such as a closed position, to a second, position, such as a partially opened position. The one or more valves 106 act as a pressure regulating device for the air control system 100. The ECU 112 sends one or more signals that include information on the mediated targets of the one or more components to the actuator controller 126. The actuator controller 126 may interpret the one or more signals to adjust the one or more valves 106 or the air compressor 108 so that the parameters of the components achieve the mediated targets.

The air control system 100 may adjust the one or more valves 106 or the air compressor 108 further based on the one or more current parameters. For example, the air control system 100 may increase the speed of the motor to increase the amount of air flow into the air compressor 108 to increase the air flow rate from a current air flow rate to the mediated air flow rate. Moreover, the air control system 100 may decrease the speed of the motor to decrease the air flow rate of the air into the air compressor 108. Moreover, if the air control system 100 allows the air to build-up without opening the back pressure valve 106a and/or the bypass valve 106b, the air pressure ratio increases. The air control system 100 may open and/or partially open the back pressure valve 106a and/or the bypass valve 106b to decrease the build-up of the air pressure, which results in a decrease of the air pressure ratio.

Figure 5:
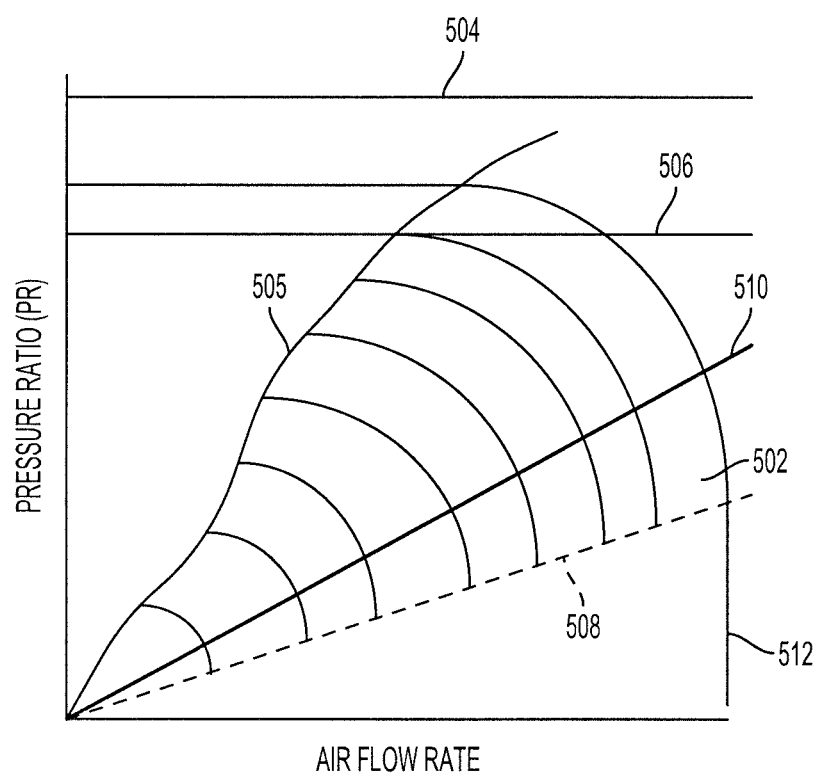
FIG. 5 is a graphical representation of different regions of operation for an air compressor of the air control system of FIG. 1 according to an aspect of the invention.

FIG. 5 is a graphical illustration of the safe operating region 502 for the air compressor 108. If the maximum air pressure ratio target 504 is greater than the maximum air pressure ratio threshold limit 506 for the air compressor 108, the air control system 100 adjusts the one or more valves 106 and/or the speed of the motor to control the air pressure ratio. The maximum air speed is shown by the max air speed line 512 which is a function of the maximum motor speed and the inter cooler 110 outlet temperature. The air control system 100 maintains operation of the air compressor 108 within the safe operating region 502 so that the air compressor 108 does not operate within the surge and/or the stall regions, which are above the surge line 505 and below the stall line 508, respectively. When all the valves 106 are open, the air compressor 108 has a normal pressure drop 510.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An air control system for a vehicle, comprising:
an air compressor configured to control air flow of air;
at least one of a back pressure valve or a bypass valve configured to adjust the air flow;
an inter cooler configured to facilitate generation of electrical energy;
a fuel cell configured to generate the electrical energy; and
an electronic control unit configured to:
obtain an air flow target and an air pressure ratio target,
compare the air flow target and the air pressure ratio target to one or more respective threshold limits for each one of the air compressor and the inter cooler,
determine that the air flow target or the air pressure ratio target would cause the air compressor or the inter cooler to operate outside a safe operating region based on the comparison,
determine an acceptable air flow target and an acceptable air pressure ratio target that limits the air flow and an air pressure of the air to operate the air compressor, the inter cooler and the fuel cell within the safe operating region, and
adjust the air compressor, the back pressure valve or the bypass valve based on the acceptable air flow target and the acceptable air pressure ratio target.

2. The air control system of claim 1, wherein the electronic control unit is configured to determine that an air temperature of air that exits or enters the air compressor, the inter cooler or the fuel cell is greater than a maximum threshold value for the air that exits or enters the air compressor, the inter cooler or the fuel cell, respectively.

3. The air control system of claim 1, wherein to adjust the air compressor, the back pressure valve or the bypass valve the electronic control unit is configured to:
adjust the bypass valve to a partially opened position; and
adjust the back pressure valve to a closed position.

4. The air control system of claim 1, wherein to adjust the air compressor the electronic control unit is configured to change a speed of a motor of the air compressor to increase or decrease the air flow.

5. The air control system of claim 4, wherein outlet air out of the air compressor has a temperature that is less than a maximum allowable air temperature of air that enters and flows into the inter cooler.

6. An air control system for a vehicle, comprising:
an air compressor configured to control air flow of air;
an inter cooler configured to facilitate generation of electrical energy;
a fuel cell configured to generate the electrical energy;
one or more valves that control or adjust the air flow to the inter cooler or the fuel cell; and
an electronic control unit configured to:
obtain an air flow target and an air pressure ratio target,
compare the air flow target and the air pressure ratio target to one or more respective threshold limits for each one of the air compressor and the inter cooler,
determine that the air flow target or the air pressure ratio target would cause the air compressor or the inter cooler to operate outside a safe operating region based on the comparison, determine an acceptable air flow target and an acceptable air pressure ratio target that causes the air compressor, the inter cooler and the fuel cell to operate within the safe operating region, and adjust the one or more valves based on the acceptable air flow target and the acceptable air pressure ratio target.

7. The air control system of claim 6, wherein to adjust the one or more valves the electronic control unit is configured to:

determine a position for the one or more valves including a back pressure valve or a bypass valve based on the acceptable air flow target and the acceptable air pressure ratio target; and adjust the back pressure valve or the bypass valve based on the position.

8. The air control system of claim 6, wherein to determine that the air flow target or the air pressure ratio target would cause the air compressor or the inter cooler to operate outside the safe operating region the electronic control unit is configured to determine that air that would enter and flow into the inter cooler would have an air temperature that is greater than a maximum threshold value.

9. The air control system of claim 6, wherein to adjust the one or more valves the electronic control unit is configured to:

move a bypass valve to a partially open position; and
move a back pressure valve to a closed position.

10. The air control system of claim 6, wherein the safe operating region of the inter cooler defines an air pressure ratio for air that enters the inter cooler that is greater than or equal to a minimum allowable pressure ratio and less than or equal to a maximum allowable pressure ratio.

11. The air control system of claim 10, wherein the safe operating region provides for the air that enters the inter cooler to have a temperature that is less than a maximum allowable temperature.

12. An air control system, comprising:

an inter cooler that is configured to facilitate generation of electrical energy;

a fuel cell that is configured to generate the electrical energy;

an air compressor configured to control air flow of air that enters or exits the air compressor, the inter cooler or the fuel cell;

at least one of a back pressure valve or a bypass valve that is configured to adjust the air flow including an air flow rate or an air pressure ratio of the air; and a processor configured to:

obtain an air flow rate target or an air pressure ratio target, obtain one or more respective threshold limits for each of the air flow rate or the air pressure ratio of the air that enters or exits the air compressor and the inter cooler, determine that the air flow rate target or the air pressure ratio target would cause the air compressor or the inter cooler to operate outside a safe operating region based on the comparison, determine an acceptable air flow rate and an acceptable air pressure ratio that limits the air flow rate or the air pressure ratio of the air so that the air compressor, the inter cooler and the fuel cell operate within the safe operating region, and adjust the air compressor, the back pressure valve or the bypass valve based on the acceptable air flow rate and the acceptable air pressure ratio.

13. The air control system of claim 12, wherein to adjust the air compressor the processor is configured to change a speed of a motor of the air compressor to increase or decrease the air flow rate.

14. The air control system of claim 12, wherein to adjust the back pressure valve or the bypass valve the processor is configured to:

adjust a position of the back pressure valve or the bypass valve to increase or decrease the air pressure ratio.

15. The air control system of claim 12, wherein at least one of the air compressor, the back pressure valve or the bypass valve is further configured to control temperature of the air that enters or exits the air compressor, the inter cooler or the fuel cell.

16. The air control system of claim 12, wherein to adjust the air compressor, the back pressure valve or the bypass valve the processor is configured to:

maintain the air pressure ratio and the air flow rate of the air that enters or exits the air compressor so that the air compressor does not operate within a surge region or a stall region, which are above a surge line and below a stall line, respectively.

* * * * *

UNITED STATES PATENT AND TRADEMARK OFFICE
CERTIFICATE OF CORRECTION

| | |
|---|---|
| PATENT NO. | : 10,714,767 B2 |
| APPLICATION NO. | : 15/835321 |
| DATED | : July 14, 2020 |
| INVENTOR(S) | : Jared Farnsworth and Shigeki Hasegawa |

It is certified that error appears in the above-identified patent and that said Letters Patent is hereby corrected as shown below:

On the Title Page

Item (12), should read as follows:
"Farnsworth et al."

Item (72), correct inventorship to read as follows:
(72) Inventors: Jared Farnsworth, Roseville, CA (US);
        Shigeki Hasegawa, Aichi-ken (JP)

Signed and Sealed this
Twenty-ninth Day of October, 2024

*Katherine Kelly Vidal*

Katherine Kelly Vidal
*Director of the United States Patent and Trademark Office*